(12) United States Patent
Uehara

(10) Patent No.: US 8,292,360 B2
(45) Date of Patent: Oct. 23, 2012

(54) DEFLECTOR DEVICE FOR A SUNROOF DEVICE

(75) Inventor: Tatsuaki Uehara, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 13/224,931

(22) Filed: Sep. 2, 2011

(65) Prior Publication Data

US 2012/0086239 A1      Apr. 12, 2012

(30) Foreign Application Priority Data

Oct. 12, 2010   (JP) ................... 2010-229996

(51) Int. Cl.
    *B60J 7/22*       (2006.01)

(52) U.S. Cl. ...................................... 296/217

(58) Field of Classification Search .......... 296/217, 296/216.02, 221

See application file for complete search history.

(56) References Cited

U.S. PATENT DOCUMENTS 4,609,222 A  *  9/1986  Boots ........................... 296/218
5,178,436 A  *  1/1993  Eberius et al. ................ 296/217
5,358,303 A  * 10/1994  Huyer .......................... 296/221

FOREIGN PATENT DOCUMENTS

| DE | 10137650    | * | 2/2003 |
| JP | 2003276446 A |   | 9/2003 |
| JP | 2006168439 A |   | 6/2006 |
| JP | 2008-137502 |   | 6/2008 |

* cited by examiner

*Primary Examiner* — Dennis Pedder
(74) *Attorney, Agent, or Firm* — Marshall & Melhorn, LLC

(57) ABSTRACT

In a deflector device for a sunroof device, a pair of arm members (7) extend in a fore and aft direction, and are each pivotally supported by a fixed roof panel part at a rear end thereof, and a blade (6) extends laterally between front ends of the arm members. A link member (13, 13') is pivotally connected to a fixed roof part at a base end thereof, and engaged by an intermediate part of each arm member at a free end thereof so that the free end may be moveable along a lengthwise direction, and a coil spring (15, 15', 16, 16') is connected between the free end of the link member and a part of the arm member so as to urge the arm member in an upward direction. Thereby, the blade can be supported in the deployed or raised position with an adequate spring force.

10 Claims, 7 Drawing Sheets

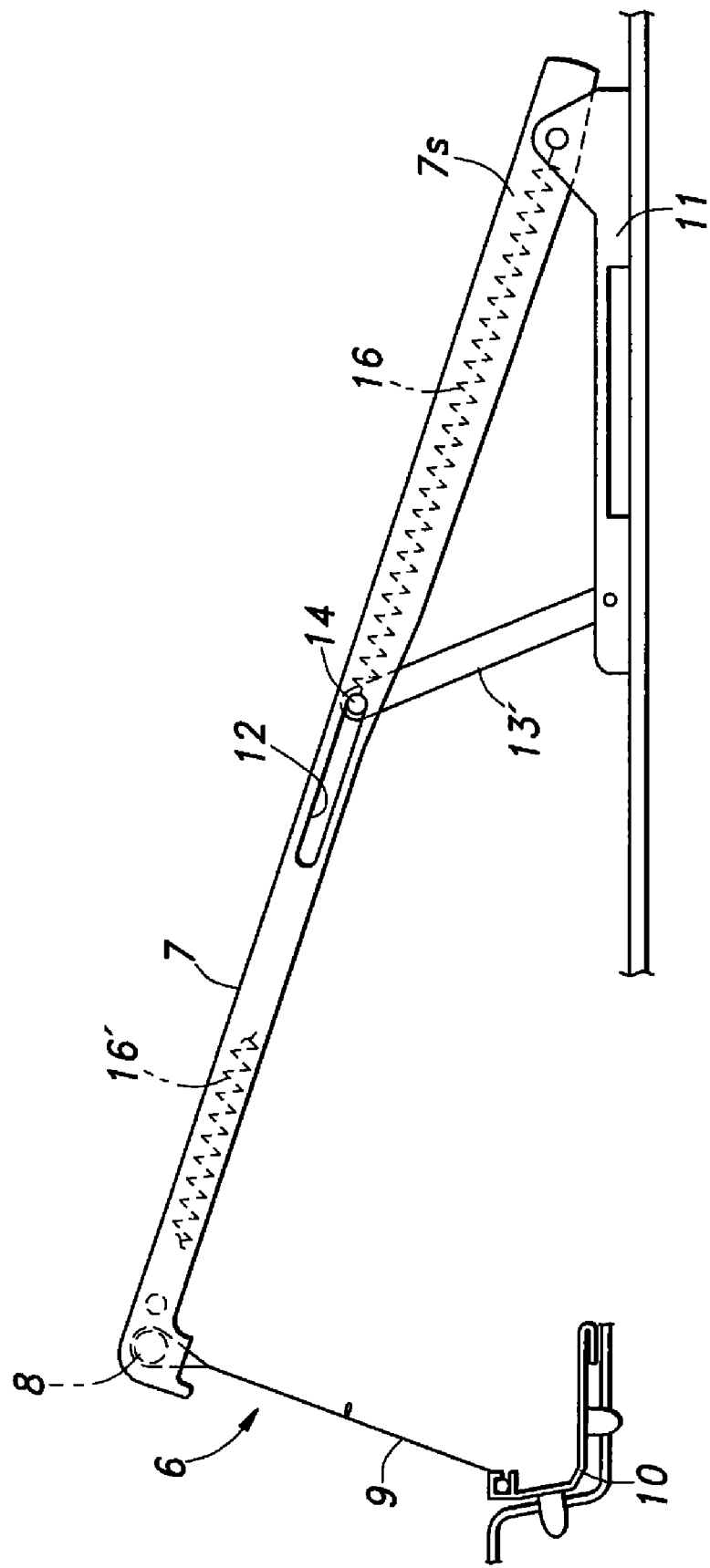

DEFLECTOR DEVICE FOR A SUNROOF DEVICE

TECHNICAL FIELD

The present invention relates to a deflector device for a vehicle sunroof device, and in particular to a deflector device that is suited for using a relatively large blade for deflecting airflow.

BACKGROUND OF THE INVENTION

The vehicle sunroof device is well known. Typically, a slide panel made of sheet glass or sheet metal is slidably provided on the roof of the vehicle to selectively close and expose an opening formed in the roof. When a vehicle fitted with a sunroof device travels at a high speed while keeping the sunroof device open, wind noises may be created and/or an excessive amount of air may be introduced into the passenger compartment. In order to control the wind noises and/or the airflow created by the sunroof device, a deflector device is often provided in a front part of the opening in the roof. Typically, the blade of the deflector device is resiliently supported by a spring such that the blade is retracted against the spring force of the spring when the sunroof panel is closed, and is deployed when the sunroof panel is opened under the spring force of the spring.

The blade can be supported by a pair of arm members extending in the fore and aft direction along either side edge of the roof opening, and each having a base end pivotally supported by an inner frame fixedly secured to the fixed roof for supporting the drive mechanism and guide rails for the slide panel and a free end connected to either lateral end of the blade. A sheet spring is interposed between each arm member and the inner frame to urge the arm member to the raised position. See JP2003-276446 and JP2006-168439, for instance.

For an improved aerodynamic performance, the blade is sometimes desired to be increased in size. JP2008-137502 discloses a blade consisting of a sheet material extending between the front edge of the roof opening and a lateral bar extending between the free ends of a pair of arm members. The lateral bar is fitted with a spring loaded winder that pays out and keeps the sheet material in tension when the deflector device is deployed, and winds up the sheet material to keep the sheet material out of the way when the deflector device is retracted.

At any event, when each arm member is required to be raised by a relatively large angle, it is difficult to configure the spring so as to produce an appropriate force under all conditions. If the spring is selected so as to produce an adequate force when the blade is deployed so as to maintain the blade in a stable condition even when the vehicle is traveling at high speed, the spring force may be excessive when each arm member is placed horizontally to retract the blade. If the spring force acting on each arm member is controlled so as to be appropriate in the retracted state of the blade, the spring force may not be adequate in the fully deployed condition of the blade to firmly hold the blade under all conditions.

Also, as the spring has to be relatively large in size so as to produce the required spring force under all conditions, the spring may not be appropriately concealed from the vehicle occupant, and this may impair the external appearance of the deflector device.

BRIEF SUMMARY OF THE INVENTION

In view of such problems of the prior art, a primary object of the present invention is to provide a deflector device for a vehicle sunroof device that can support a blade thereof in the deployed or raised position with an adequate spring force while avoiding the spring force required to put the blade into the fully retracted position from becoming excessive.

A second object of the present invention is to provide a deflector device for a vehicle sunroof device that is highly compact, and favorable in external appearance.

To achieve such objects, the present invention provides a deflector device for a sunroof device, the sunroof device including a slide panel configured to selectively close an opening in a fixed roof panel of a vehicle body, comprising: a pair of arm members each extending in a fore and aft direction along a corresponding side edge of the roof opening, and having a rear end pivotally supported by a fixed roof panel part for a vertical tiling motion of the arm member; a blade extending laterally between front ends of the arm members adjacent to a front edge of the opening; a link member having a base end pivotally connected to a fixed roof part and a free end engaged by an intermediate part of each arm member so as to be moveable relatively to the arm member along a lengthwise direction of the arm member; and a coil spring connected between the free end of the link member and a part of the arm member so as to urge the arm member in an upward direction.

The coil spring is able to produce a relatively constant spring force over a wide range of deformation so that the spring is capable of supporting the blade of the deflector device in the deployed or raised position with an adequate spring force while avoiding the spring force required to put the blade into the fully retracted position from becoming excessive.

When each arm member comprises a hollow member receiving the coil spring therein, the coil spring can be conveniently concealed inside the arm member so that the deflector device can be constructed as a highly compact unit, and can be made favorable in external appearance. Preferably, each arm member comprises a channel member having an open side facing downward.

According to a particular preferred embodiment of the present invention, the intermediate part of each arm member is provided with a longitudinal slot, and a pin is passed through the longitudinal slot and across the free end of each link member for slidably guiding the free end of the link member along a length of the arm member. Conveniently, an end of the slot may be configured to define an upper limit of a tilting movement of the arm member by engaging the pin.

The blade may comprise a stiff lateral bar extending between the front ends of the arm members and a flexible sheet member extending between the lateral bar and a fixed roof member adjacent to a front edge of the roof opening so that a high aerodynamic performance may be achieved while allowing the blade to be retracted in a relatively small space.

Preferably, the base end of each link member is located ahead of the free end of the link member, and the coil spring comprises a tension coil spring having one end engaged by the free end of the link member and another end engaged by the front end of the arm member. Alternatively, the base end of each link member is located behind the free end of the link member, and the coil spring comprises a tension coil spring having one end engaged by the free end of the link member and another end engaged by the rear end of the arm member.

BRIEF DESCRIPTION OF THE DRAWINGS

Now the present invention is described in the following with reference to the appended drawings, in which:

FIG. 7 is a view similar to FIG. 3 showing a second embodiment of the deflector device of the present invention.

DETAILED DESCRIPTION OF THE PREFERRED EMBODIMENT(S)

A deflector device 5 for a sunroof device according to the present invention is described in the following with reference to FIGS. 1 to 3. As the deflector device 5 is essentially symmetric about a central longitudinal line of the vehicle body, only one half of the structure is described in part of the description to avoid redundancy in the description.

Figure 1:
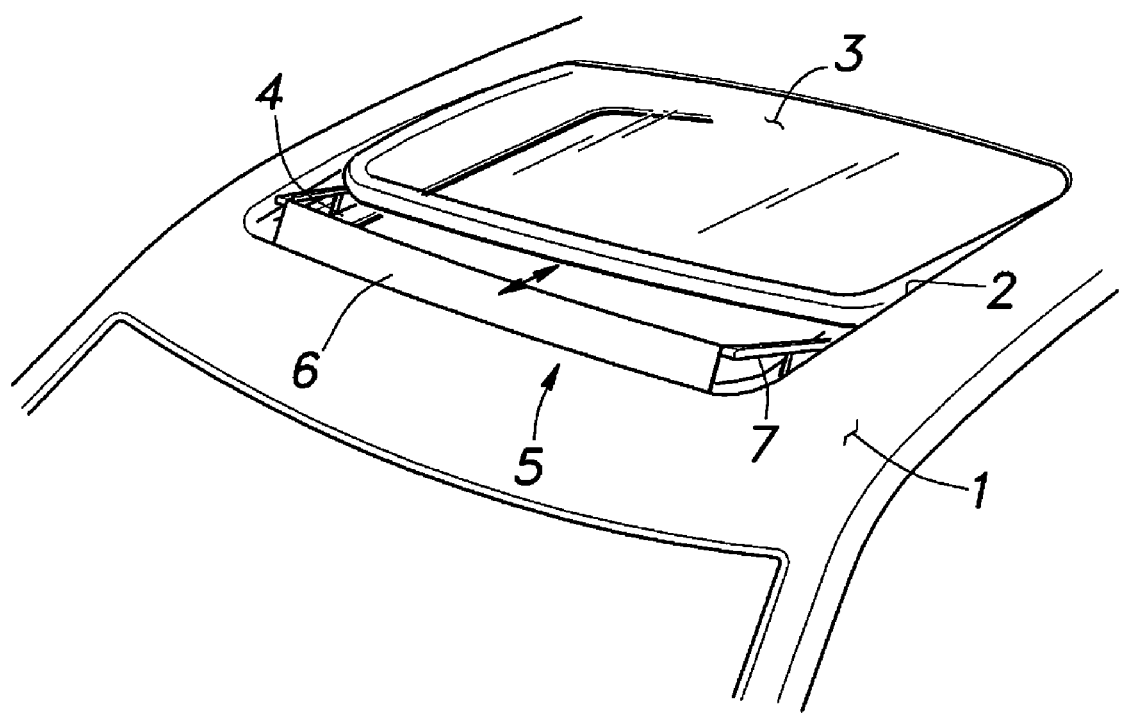
FIG. 1 is a perspective view of a sunroof device to which the present invention is applied.

Referring to FIG. 1, a rectangular opening 2 is formed centrally in a front part of a fixed roof 1 of the vehicle body, and a slide panel 3 which may consist of a glass panel and is given with a peripheral profile corresponding to the shape of the roof opening 2 is supported by the fixed roof 1 so as to be slidable in the fore and aft direction, and thereby selectively open and close the roof opening 2 in a per se known manner.

More specifically, a pair of guide rails 4 are provided on the fixed roof 2 so as to extend along either side edge of the opening 2 and slidably guide the slide panel 3. Also, an arrangement may be made so as to selectively tilt the slide panel 3 in a rear end up disposition. A deflector device 5 is provided on the fixed roof 1, as will be described hereinafter, to control the airflow that is produced along the upper surface of the roof when the vehicle is traveling at high speed while the roof opening 2 is kept open.

Figure 2:
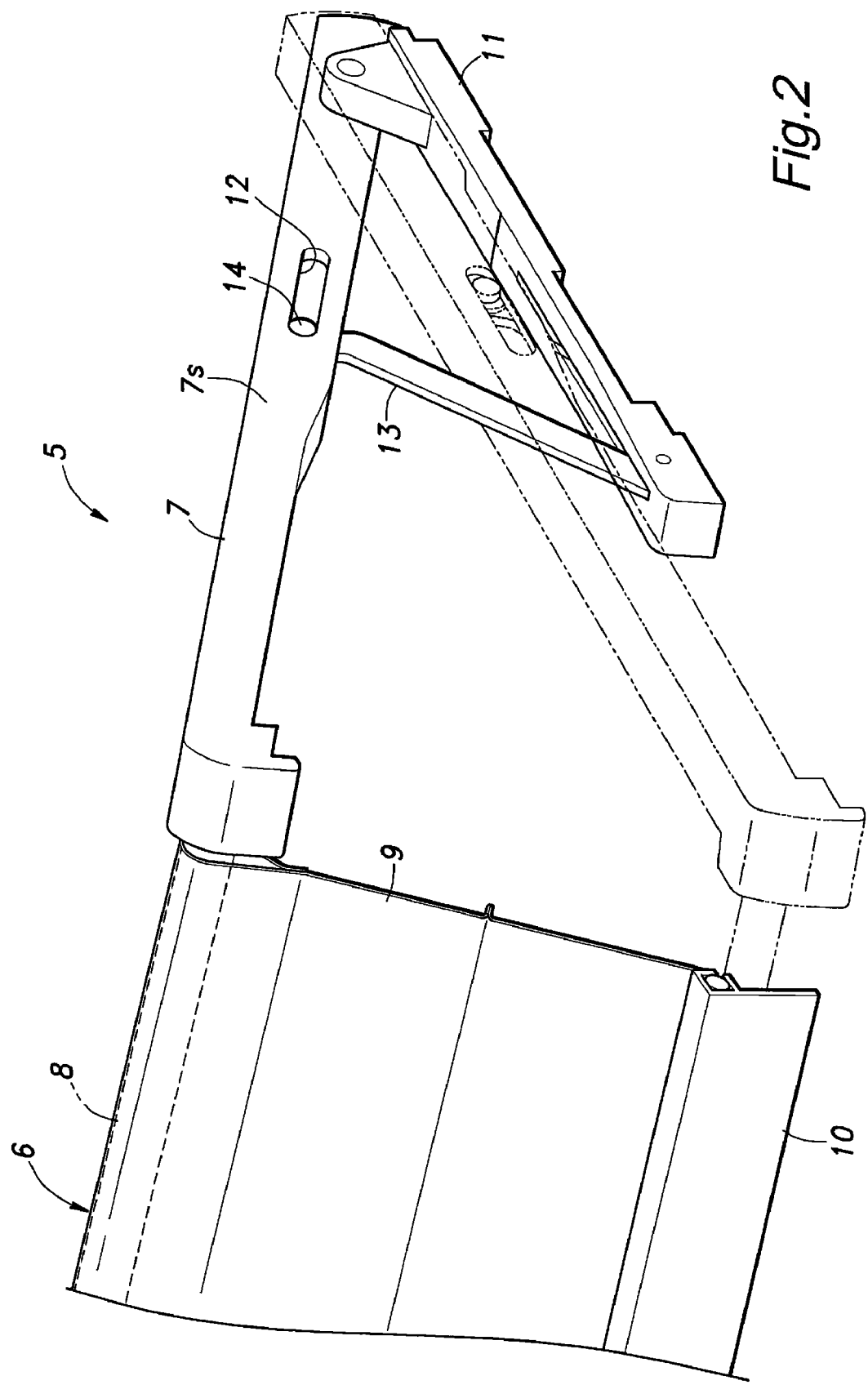
FIG. 2 is a fragmentary perspective view of a deflector device embodying the present invention.

As shown in FIG. 2, the deflector device 5 includes a pair of elongated base members 11 each fixedly attached to the vehicle body (inner frame) and extending in the fore and aft direction next to an outboard side of the corresponding guide rail (not shown in the drawing). A base end of an arm member 7 is pivotally connected to a rear end of each base member 11 via a lateral pivot pin. A blade 6 is connected between free ends of the two arm members 7 so as to extend laterally along the front edge of the opening 2. The blade 6 includes a lateral bar 8 made of a relatively stiff, elongated member extending laterally substantially across the width of the opening 2 and a rectangular, flexible sheet member 9 having an upper end secured to the lateral bar 8 and a lower end secured to a vehicle body member 10 fixedly attached to the fixed roof 1. Each lateral end of the lateral bar 8 is fixedly connected to the free end of the arm 7 in the illustrated embodiment.

Figure 3:
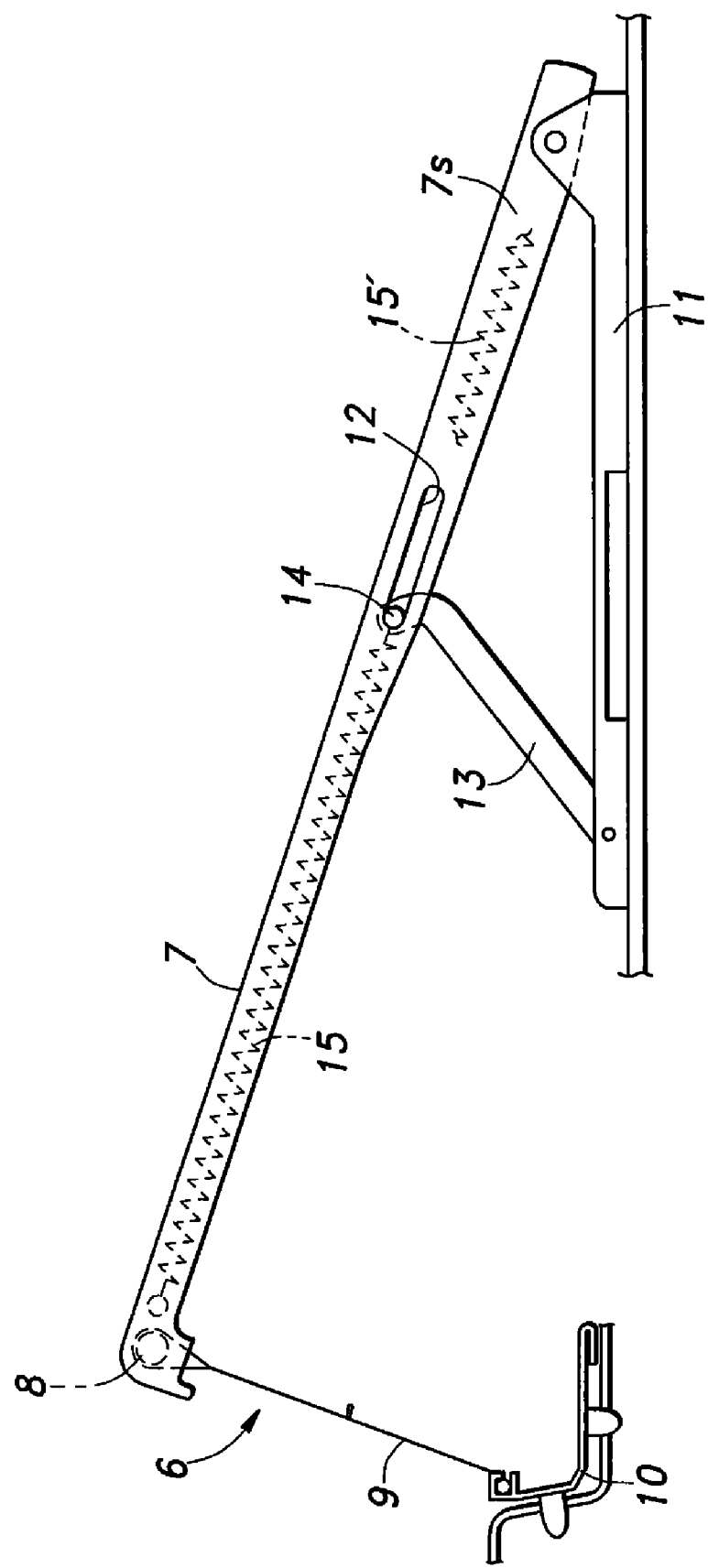
FIG. 3 is a side view showing the deflector device in the deployed state.

As shown in FIGS. 2 and 3, each arm member 7 is made of a channel member having a rectangular cross section with an open side facing downward. A longitudinal slot 12 is formed in an intermediate part of each side wall 7s of the arm 7 in a mutually aligned relationship. A link member 13 is pivotally connected to a front end of each base member 11 at a base end thereof via a laterally extending pivot pin. A free end of the link member 13 is received between the side walls 7s of the arm member 7, and a pin 14 is passed laterally through the slots 12 and across the free end of the link member 13 so that the free end of the link member 13 is moveable relative to the arm member 7 to the extent permitted by the movement of the pin 14 inside the slots 12. Grooves or other or other linear guide arrangement may also be used instead of the slots 12.

A tension coil spring 15 is received inside the arm member 7, and is engaged by the pin 14 at one end thereof, and by a free end part of the arm member 7 at the other end thereof. Thereby, the pin 14 is normally urged toward the front end of the slots 12 or toward the free end of the link member 13. As a result, the arm 7 is tilted upward as illustrated in FIG. 2 under the spring force of the tension coil spring 15. The upper limit of the angular movement of the arm member 7 is restricted by the pin abutting the front ends of the slots 12.

Figure 4:
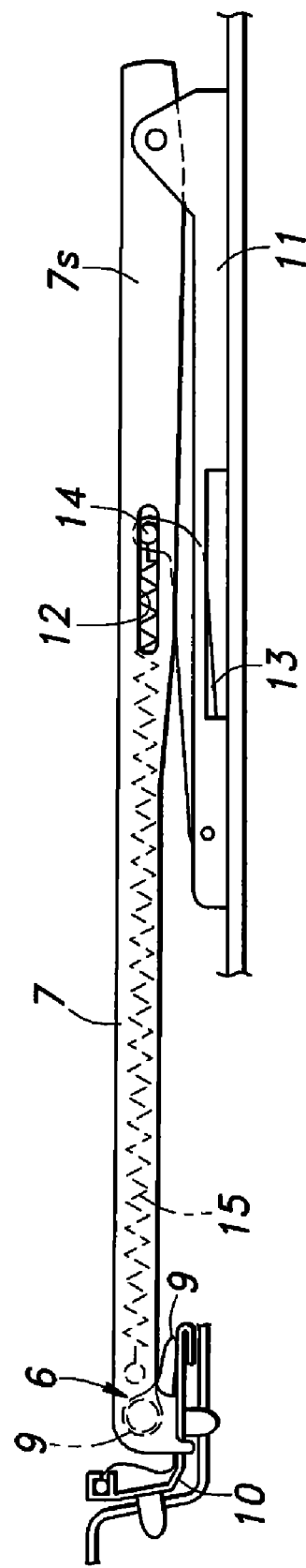
FIG. 4 is a side view showing the deflector device in the retracted state.

When the arm member 7 is pushed downward, for instance by the forward movement of the slide panel 3, the arm member 7 may be forced downward into a horizontal disposition against the spring force of the tension coil spring 15 as shown in FIG. 4. The slots 12 are long enough to accommodate the horizontal positioning of the arm member 7 as can be appreciated by a person skilled in the art.

When the arm members 7 are fully tilted upward, the sheet member 9 extends tautly between the front edge of the roof opening 2 and the lateral bar 8. When the arm members 7 are forced into the horizontal disposition, the sheet member 9 is folded into a space defined between the lateral bar 8 and the opposing surface of the roof panel (or the recessed shelf part of the roof panel defining the front edge of the roof opening 2). Therefore, even when the sheet member 9 has a relatively large vertical dimension in the deployed state, the sheet member 9 can be folded in a relatively small space available between the lateral bar 8 and the roof panel. The sheet member 9 may consists of thin plastic sheet, fabric, mesh, a series of slats or any material that can be deployed and folded as required.

In particular, because the fully raised position of the blade 6 is defined by the abutting of the pin 14 onto the front end of the slots, the excessive tensioning of the sheet member 9 can be avoided. In other words, a stopper mechanism for defining the fully tilted condition of the blade 6 is formed by the cooperation between the pin 14 and the front end of the slots 12. This is highly beneficial for ensuring the durability of the sheet material 9.

The tension coil spring 15 is used in the illustrated embodiment for urging the arm member 7 into the fully tilted condition, but other forms of spring members can also be used. For instance, a compression coil spring 15' may be connected between the pin 14 and a rear end part of the arm member 7. Again, the compression coil spring 15' is received in the space defined between the two side walls 7s of the arm member 7. However, the use of the tension coil spring is highly advantageous because not only the space inside the arm member can be efficiently used for receiving the tension coil spring but also no arrangement is required for controlling the mode of deformation of the tension coil spring. When a compression coil spring is used, instead of a tension coil spring, the compression coil spring may bulge laterally when compressed, and some countermeasure may be required depending on the given arrangement.

Figure 5:
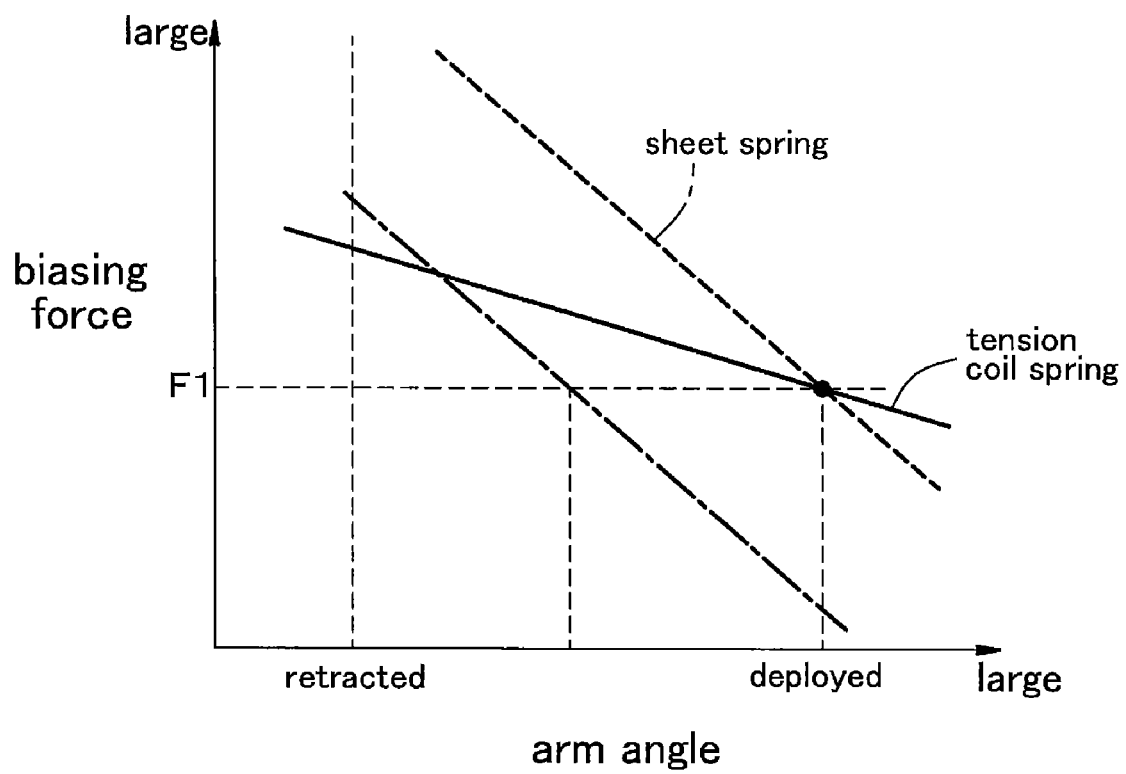
FIG. 5 is a graph comparing the changes in the spring force with the angle of the arm member.

It should be noted that the tension coil spring can be configured to produce a relatively constant spring force over a wide range of deformation as opposed to a sheet spring. This is particularly important when a relatively large lift stroke is required of the arm member or a relatively large height is required of the deflector device in the deployed state. The tension coil spring 15 is required to produce an adequate spring force in the fully tilted condition of the arm member 7 to maintain the deployed condition of the blade 6 even when the vehicle is traveling at high speed. See the graph in FIG. 5. When the arm member 7 is pushed downward against the spring force of the tension coil spring 15, the spring force increases with the downward stroke of the arm member 7 as indicated by the solid line in the graph of FIG. 5. However, the spring force of the tension coil spring 15 is relatively insignificant even when the blade 16 is fully retracted.

Figure 6:
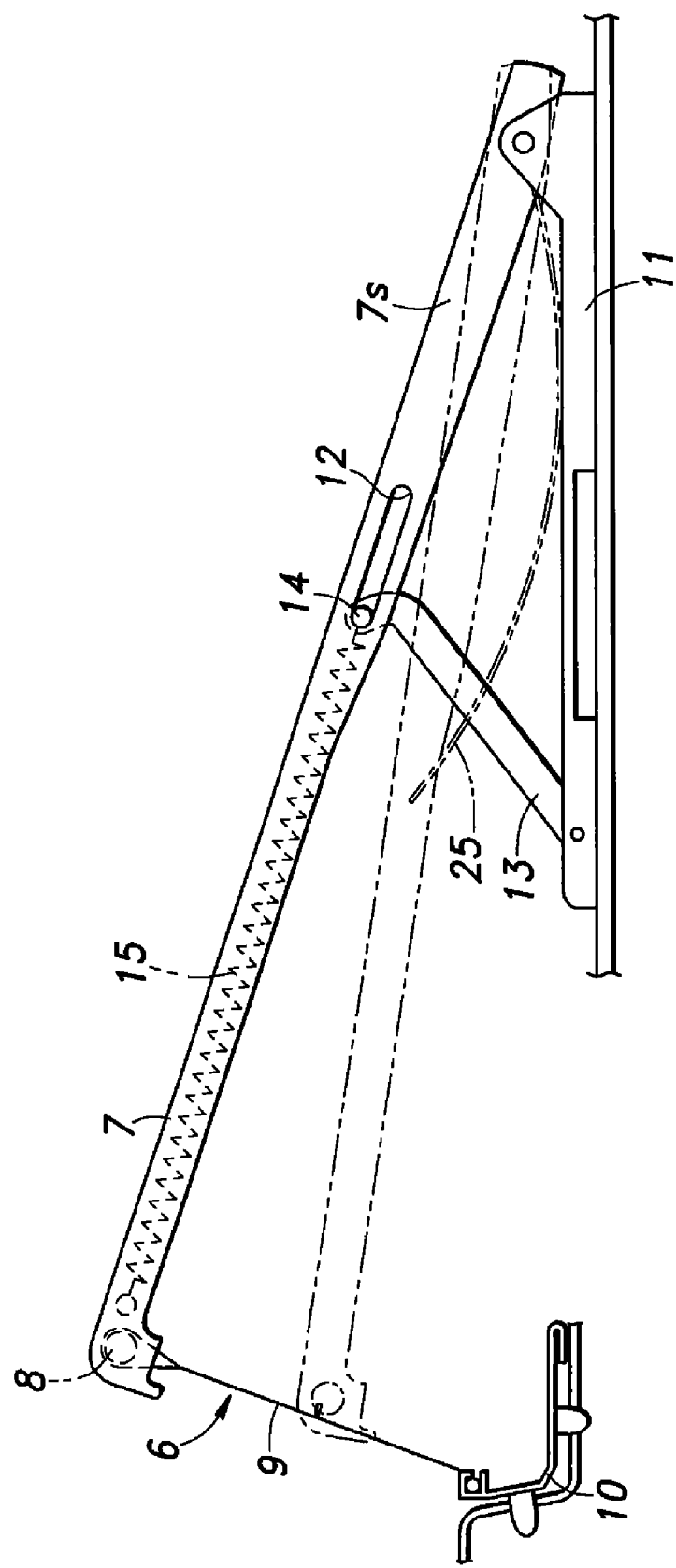
FIG. 6 is a side view contrasting the present invention over the prior art.

On the other hand, if a sheet spring 25 is used instead of the tension coil spring as shown by the imaginary line in FIG. 6, the spring force of the sheet spring 25 changes significantly as the blade 16 is moved between the deployed state and fully retracted state. If the sheet spring 25 is configured to produce an adequate spring force in the deployed state of the blade 16, the spring force increases to an unacceptably high value in the fully retracted state of the blade as indicated by the broken line in FIG. 5. If the sheet spring 25 is configured to produce a tolerable spring force in the retracted state of the blade 16, the spring force will be unacceptably small in the deployed state of the blade as indicated by the chain-dot line in FIG. 5.

The use of the tension coil spring 15 is advantageous also because it can be conveniently concealed inside the arm member 7 so that the external appearance of the deflector device 5, in particular from inside the passenger compartment, is not detracted by the presence of the tension coil spring 15.

FIG. 7 shows a second embodiment of the present invention. The parts corresponding to those of the previous embodiment are denoted with like numerals in FIG. 7, and the description of such parts are omitted in the following description. In the previous embodiment, the free end of the link member 13 was located behind the base end of the link member 13 at all times as seen along the fore and aft direction of the vehicle. However, in the present embodiment, the free end of the link member 13' is located ahead of the base end of the link member 13' at all times as seen along the fore and aft direction of the vehicle. A tension coil spring 16 is received inside the arm member 7 (or between the side walls 7*s* of the arm member 7), and has an end engaged by the pin 14 and the other end engaged by a rear end part of the arm member 7.

As can be readily appreciated, the spring force of the tension coil spring 16 urges the pin 14 rearward or against the rear end of the slots 12, and thereby holds the arm member 7 in the fully tilted position. When the arm member 7 is pushed downward against the spring force of the tension coil spring 15, the pin 14 travels forward in the slots 12 until the arm member 7 reaches the horizontal position.

In this embodiment also, a compression coil spring 16' may be used, instead of the tension coil spring 16. In such a case, one end of the compression coil spring 16' is connected to the pin 14, and the other end of the compression coil spring 16' is connected to a front end part of the arm member 7.

Thus, in a deflector device for a sunroof device, a pair of arm members 7 extend in a fore and aft direction along a corresponding side edge of the roof opening 2, and are each pivotally supported by a fixed roof panel part at a rear end thereof for a vertical tiling motion, and a blade 6 extends laterally between front ends of the arm members adjacent to a front edge of the opening. A link member 13, 13' is pivotally connected to a fixed roof part at a base end thereof, and engaged by an intermediate part of each arm member at a free end thereof so that the free end may be moveable relatively to the arm member along a lengthwise direction of the arm member, and a coil spring 15, 15', 16, 16' is connected between the free end of the link member and a part of the arm member so as to urge the arm member in an upward direction. Thereby, the blade can be supported in the deployed or raised position with an adequate spring force while avoiding the spring force required to put the blade into the fully retracted position from becoming excessive. Each arm member may consist of a channel member so that the coil spring can be conveniently concealed within the arm member.

Although the present invention has been described in terms of preferred embodiments thereof, it is obvious to a person skilled in the art that various alterations and modifications are possible without departing from the scope of the present invention which is set forth in the appended claims. For instance, the base end of the link member is located ahead of the free end thereof, but the base end of the link member may also located behind the free end thereof. In such a case, the tension coil may be replaced by a compression coil spring or, alternatively, a tension coil spring may be connected between the pin 14 and a base end of the arm member.

The contents of the original Japanese patent application on which the Paris Convention priority claim is made for the present application as well as the contents of the prior art references mentioned in this application are incorporated in this application by reference.

The invention claimed is:

1. A deflector device for a sunroof device, the sunroof device including a slide panel configured to selectively close an opening in a fixed roof panel of a vehicle body, comprising:
   a pair of arm members each extending in a fore and aft direction along a corresponding side edge of the roof opening, and having a rear end pivotally supported by a fixed roof panel part for a vertical tilting motion of the arm member;
   a blade extending laterally between front ends of the arm members adjacent to a front edge of the opening;
   a link member having a base end pivotally connected to a fixed roof part and a free end engaged by an intermediate part of each arm member so as to be moveable relatively to the arm member along a lengthwise direction of the arm member; and
   a coil spring connected between the free end of the link member and a part of the arm member so as to urge the arm member in an upward direction.

2. The deflector device for a sunroof device according to claim 1, wherein each arm member comprises a hollow member receiving the coil spring therein.

3. The deflector device for a sunroof device according to claim 2, wherein each arm member comprises a channel member having an open side facing downward.

4. The deflector device for a sunroof device according to claim 1, wherein the intermediate part of each arm member is provided with a longitudinal slot, and a pin is passed through the longitudinal slot and across the free end of each link member for slidably guiding the free end of the link member along a length of the arm member.

5. The deflector device for a sunroof device according to claim 4, wherein an end of the slot defines an upper limit of a tilting movement of the arm member by engaging the pin.

6. The deflector device for a sunroof device according to claim 1, wherein the blade comprises a stiff lateral bar extending between the front ends of the arm members and a flexible sheet member extending between the lateral bar and a fixed roof member adjacent to a front edge of the roof opening.

7. The deflector device for a sunroof device according to claim 1, wherein the base end of each link member is located ahead of the free end of the link member, and the coil spring comprises a tension coil spring having one end engaged by the free end of the link member and another end engaged by the front end of the arm member.

8. The deflector device for a sunroof device according to claim 1, wherein the base end of each link member is located ahead of the free end of the link member, and the coil spring comprises a compression coil spring having one end engaged by the free end of the link member and another end engaged by the rear end of the arm member.

9. The deflector device for a sunroof device according to claim 1, wherein the base end of each link member is located behind the free end of the link member, and the coil spring comprises a compression coil spring having one end engaged by the free end of the link member and another end engaged by the front end of the arm member.

10. The deflector device for a sunroof device according to claim 1, wherein the base end of each link member is located behind the free end of the link member, and the coil spring comprises a tension coil spring having one end engaged by the free end of the link member and another end engaged by the rear end of the arm member.

* * * * *